United States Patent [19]

Berthelemy et al.

[11] Patent Number: 5,678,164

[45] Date of Patent: Oct. 14, 1997

[54] PROCESS FOR OBTAINING A BLADED CIRCULAR METALLIC ARTICLE

[75] Inventors: Jean-Claude Berthelemy, Mennecy; Ludovic Edmond Camille Molliex, Paris, both of France

[73] Assignee: Societe Nationale d'Etude et de Construction de Moteurs d'Aviation "Snecma", Paris, France

[21] Appl. No.: 518,972

[22] Filed: Aug. 24, 1995

[30] Foreign Application Priority Data

Aug. 24, 1994 [FR] France .................. 94 10238

[51] Int. Cl.$^6$ ........................... B22F 1/00
[52] U.S. Cl. ................. 419/5; 419/14; 419/38; 228/189
[58] Field of Search ............ 419/5, 14, 28, 419/38, 68; 228/189

[56] References Cited

U.S. PATENT DOCUMENTS

| | | |
|---|---|---|
| 3,940,268 | 2/1976 | Catlin .................. 75/208 |
| 4,485,961 | 12/1984 | Ekbom et al. ............ 228/193 |
| 4,680,160 | 7/1987 | Helmink . |
| 5,226,982 | 7/1993 | Eylon . |

FOREIGN PATENT DOCUMENTS

| | | |
|---|---|---|
| 0 042 744 | 12/1981 | European Pat. Off. . |
| 0 171 344 | 2/1986 | European Pat. Off. . |
| 2 375 441 | 7/1978 | France . |
| 2 602 266 | 2/1988 | France . |
| 2 637 319 | 4/1990 | France . |

*Primary Examiner*—Peter A. Nelson
*Assistant Examiner*—Anthony R. Chi
*Attorney, Agent, or Firm*—Oblon, Spivak, McClelland, Maier & Neustadt, P.C.

[57] ABSTRACT

A process for constructing a circular metallic article which includes a hub and a plurality of vanes mounted on the periphery of the hub wherein the vanes are placed in position around the hub, formers are arranged between the blade portions of the vanes, a dimensionally stable belt having a low thermal expansion coefficient is placed circumferentially around the vanes and the formers, and the assembly is subjected to an isostatic compression at the isothermal forging temperature and pressure of the materials of the hub and the vanes such that the vanes are diffusion welded to the hub and the blade portions of the vanes are compressed to shape.

10 Claims, 1 Drawing Sheet

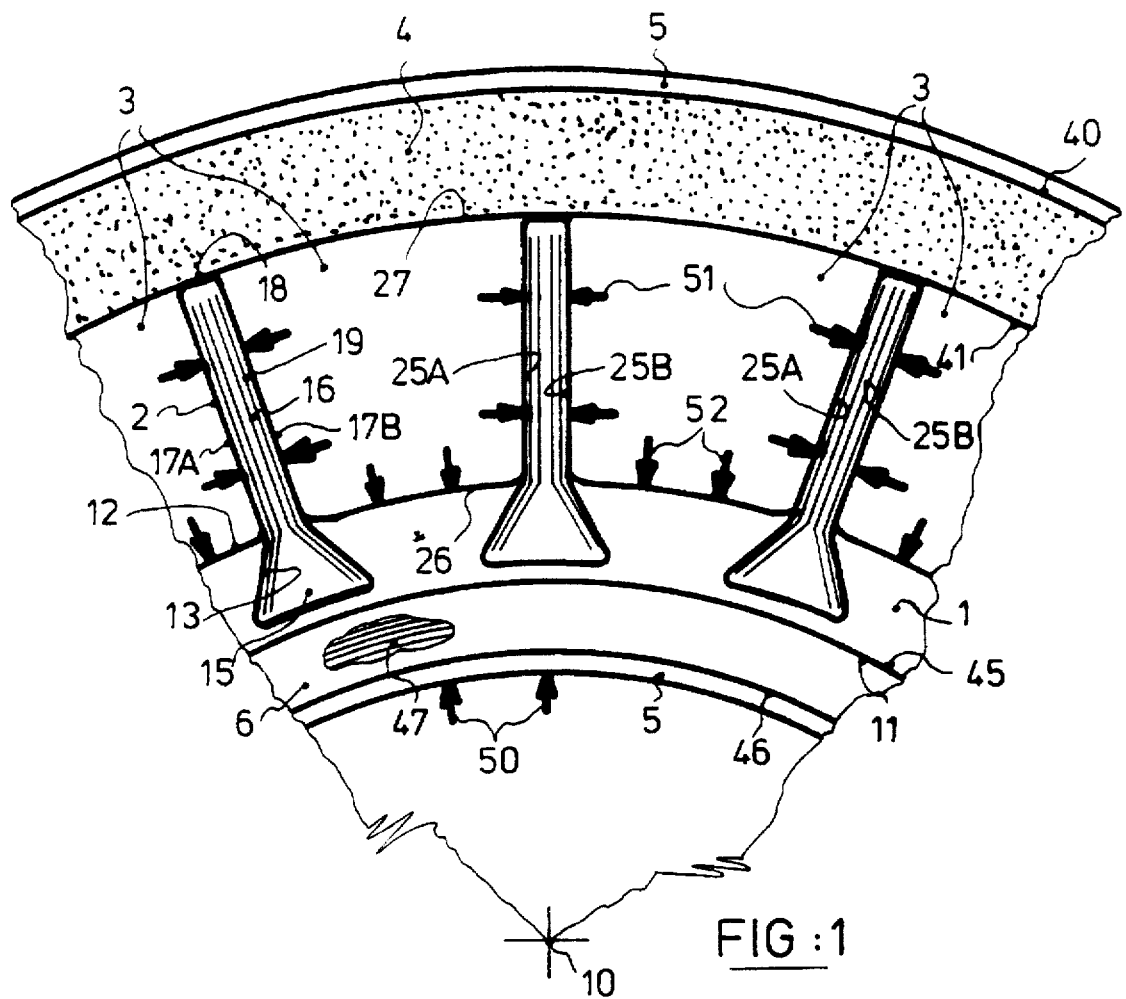
FIG: 1
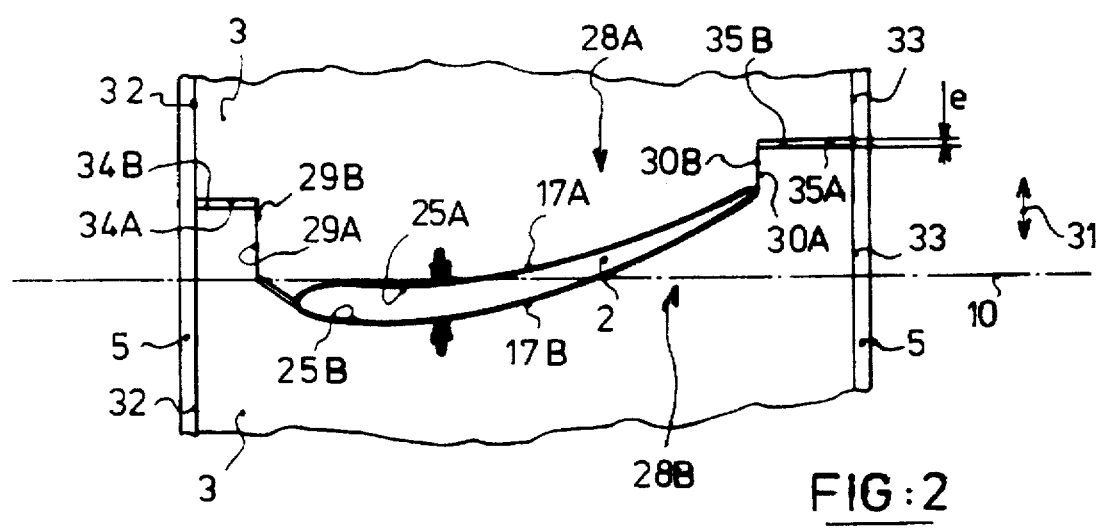
FIG: 2

PROCESS FOR OBTAINING A BLADED CIRCULAR METALLIC ARTICLE

BACKGROUND OF THE INVENTION

1. Field of the Invention

The invention relates to a process for obtaining a bladed circular metallic article, such as a turbo-machine rotor, in which the blades are formed by vanes which are welded on a hub, the vanes and the hub possibly being reinforced by fibers.

2. Description of the Prior Art

Traditionally, a turbo-machine rotor comprises a circular hub on which a plurality of vanes are arranged around the periphery. The hub is disc-shaped, and each of the vanes has a blade portion and a root in the form of a swelling which is received in a respective groove machined in the periphery of the hub to connect the vane to the hub. The presence of the groove requires a substantial thickness of material in the hub, which increases the mass of the rotor and the stress imposed on the hub by centrifugal force, but does not contribute to the resistance of the hub to this centrifugal force. It is possible to dispense with this extra thickness of material by cutting the vanes directly from the mass of the hub by milling and chemical machining, but this solution is very costly.

Lighter rotors are known in which the vanes are made separately and subsequently welded to the hub by hot isostatic compression at the isothermal forging temperature of the materials employed. French patent 2 602 266 discloses an example of this, in which the peripheries of the vane roots are welded to the hub under vacuum by electron beam, and the assembly is then subjected to hot isostatic compression in an autoclave in order to diffusion weld the roots of the vanes onto the hub throughout their contacting surfaces. This technique is difficult to implement, and the positioning of the vanes remains imprecise as a consequence of the crushing of the roots and the softening of the vanes which are not held during the hot compression.

U.S. Pat. No. 4 680 160 proposes another method of constructing a rotor with welded vanes, in which the vanes are positioned in cells on the circumference of a mould in which the hub of the rotor is placed in several parts. The assembly is heated to the isothermal forging temperature of the hub, and then a piston presses the hub into the mold to bring about the diffusion welding of the parts of the hub and of the vanes to hub.

Also known are rotors made of a metallic composite in which a metal alloy constitutes a matrix containing reinforcement fibers such as, for example, silicon carbide or boron carbide fibers. It is known to reinforce a hub by welding one or more metallic composite rings. This process enables the hub to be made lighter by giving it the shape of a rim with small radial thickness.

It is also known to make separate vanes from a metallic composite such as disclosed, for example, in French patent 2 375 441. In such vanes, reinforcement fibers arranged parallel along the length of the blade portion and at the center thereof are generally combined with slanting and crossing fibers arranged on the surface. The root may be formed by spreading the fibers apart with added metal. The blade portions of the vanes are obtained by pressing in a direction perpendicular to the fibers, i.e., in the direction of the thickness of the blade portion, and they offer outstanding centrifugal and impact strength, which enables them to be made thinner.

It is also known to construct rotors in which both the hub and the vanes are of a composite material, such as shown in French patent 2 637 319. The rotor, comprising the hub and the vanes, is cut in the mass of a preform of fibers, the warp thread of which is spiralled and the weft thread radial. Densification is effected by chemical vapor deposition (CVD) of the matrix material. Such a rotor offers excellent centrifugal strength due to the fact that the hub is reinforced by the spiralled warp thread, whereas the vanes are reinforced by the radial weft thread which extends inside the hub. However, the blade portions of the vanes are fragile to impact, as it is not possible to drape the surface of these vanes with slanting and crossing fibers. The rotor is also costly to make as it involves machining the vane blanks in the mass of the rotor, a CVD impregnation, and a finish machining of the impregnated vanes on the rotor.

Accordingly, it is an object of the invention to provide an economic and accurate process for constructing a metallic turbo-machine rotor in which the vanes are made separately and are welded to the hub and in which the hub and the vanes may be reinforced with fibers in an optimum arrangement if desired.

SUMMARY OF THE INVENTION

According to the invention there is provided a process for constructing a bladed circular metallic article comprising a hub and a plurality of vanes mounted on said hub, said process comprising the steps of:

a) making said hub and said vanes separately from alloys which are capable of being forged under the temperature and pressure conditions at which said alloys can be diffusion welded;

b) positioning said vanes on said hub; and, c) subjecting said hub to isostatic compression and at the same time compressing the blade portions of said vanes in the direction of the thickness thereof under conditions whereby said vanes are diffusion welded to said hub and said blade portions of said vanes are shaped.

More particularly, the process may involve making each vane with a blade portion and a root and so that the thickness of the blade portion is slightly greater than that in the finished article;

positioning the vanes around the hub alternately with formers made of a material having a high thermal expansion coefficient, and surrounding the assembly of hub, vanes and formers with a rigid belt made of a material having a very low or negligible thermal expansion coefficient;

placing the surrounded assembly in a deformable metallic envelope under vacuum;

and conducting the isostatic compression in an autoclave at the isothermal forging temperature and pressure for the metals of the hub and of the vanes.

As the temperature rises, the formers expand circumferentially and compress the blade portions of the vanes, as the belt substantially prevents their expansion radially outwards. The formers are arranged so that there is a circumferential clearance between successive formers when cold, but so that they abut when hot, thus ensuring a strict distribution and positioning of the formers around the circumference of the hub. Preferably the lateral faces of the formers have shapes complementary to the lateral faces of the blade portions of the vanes, so that when the formers expand and bring their lateral faces into contact with the blade portions, they not only hold the vanes in a strict position, but also impart to the blade portions of the vanes their final thickness and shape.

During this time, the pressure of the autoclave causes the material of the hub to bear against the roots of the vanes and thus brings about diffusion welding of the vane roots to the hub. The autoclave pressure also presses the material of the hub against the formers, thus imparting a strict geometry to the outer surface of the hub.

Preferably, the vanes will be made of a metallic composite material with an optimum arrangement of the fibers for maximum strength. It will also be possible to place against the hub one or more metallic composite rings which will be welded to the hub by diffusion during the isostatic compression at the isothermal forging temperature of the materials of the rotor.

Also, grooves will preferably be machined on the periphery of the hub so as to be able to embed the vanes in the hub. With this arrangement, the fibers reinforcing the vane can be received in the volume of the hub, and the vane-hub welding surface is increased, which improves the strength of the rotor. At the end of the welding of the vanes to the hub in the process of the invention, the lateral faces of the vanes and the outer surface of the hub will generally have their final shape and dimensions, without any need for an additional machining stage, which would be costly because of the complexity of the shapes to be achieved.

The process enables light rotors made of composite materials to be produced having an optimum arrangement of the reinforcing fibers: i.e. circular fibers in the hub, radial fibers along the length of the vanes and extending into the hub, and with the possibility of draping the surface of the blade portions of the vanes.

The process also enables reinforcement rings to be welded to the hub at the same time as the vanes, which does away with the need for an additional thermal cycle which causes degradation of the reinforcement fibers.

Further preferred features and advantages of the invention will become apparent from the following description of a preferred embodiment, given by way of example, with reference to the attached drawings.

BRIEF DESCRIPTION OF THE DRAWINGS

FIG. 1 represents a radial section through a sector of an assembly comprising the hub, the vanes, the formers, the surrounding belt and envelope, during hot isostatic compression of the assembly in one embodiment of the invention, the axis of rotation being shown nearer to said section than it actually is for the sake of convenience; and FIG. 2 shows an end view of the blade portion of a vane clamped between two formers.

DESCRIPTION OF THE PREFERRED EMBODIMENT

With reference to FIG. 1, a rotor comprises a hub 1 and a plurality of vanes 2 which are diffusion welded on the periphery of the hub. To do this, formers 3 are arranged between the vanes 2. The assembly consisting of the hub 1, the vanes 2 and the formers 3 is surrounded by a belt 4, and then placed under vacuum in a deformable sealed envelope 5. Diffusion welding of the vanes 2 to the hub 1 is then carried out in an autoclave at the conditions of temperature and pressure required for isothermal forging of the material used. One or more fibrous reinforcement rings 6 may also be welded to the hub 1 in the same operation.

The hub 1 is generally in the form of a body of revolution around its geometrical axis 10, being bounded internally by a concave cylindrical wall 11 and externally by a convex cylindrical wall 12. A plurality of grooves 13 opening in the external wall 12 are provided on the periphery of the hub 1 for receiving and holding the vanes 2. The vanes 2 each have a root 15 which fits slidingly into a groove 13, and a blade portion 16 emerging radially from the hub 1 through the mouth of the groove 13. The groove 13 and the root 15 have a dovetailed complementary shape and serve to position and connect the vanes 2 on the hub 1 before welding. The blade portion 16 of each vane has two lateral faces 17A and 17B and a tip 18 remote from the root 15, the tip 18 coming into contact with the belt 4. The vanes 2 are reinforced by fibers 19 which extend through the blade portion 16 in the direction of its height and terminate inside the root 15. Other layers of fibers not shown may be crossed with the fibers 19, for example on the surface of the blade portion, to improve its strength.

The formers 3 are placed between the blade portions 16 of the vanes. Each of the formers 3 has two lateral faces 25A and 25B at opposite ends arranged to contact the facing lateral faces 17A and 17B of the blade portions of the vanes between which the former is located, the faces 25A and 25B having shapes complementary to those of the finished vanes. The formers 3 also have an internal surface 26 which contacts the outer wall 12 of the hub, and an external part-cylindrical convex surface 27 which contacts the belt 4. The internal surface 26 of each formers 3 has a shape complementary to that of the external surface 12 of the hub. In this example, the surface 26 is a part-cylindrical concave surface, but more complex shapes for the external surface 12 of the hub can be accommodated.

Referring now to FIG. 2, one of the lateral faces, 17A for example, of each vane 2 is termed the intrados face and is generally concave, while the other lateral face 17B is termed the extrados face and is generally convex. Thus, one of the lateral faces, 25A for example, of each former 3 will be convex and complementary to the concave lateral face 17A of a vane, while the other lateral face 25B of the former 3 is concave and complementary to the lateral face 17B of a vane.

The convex lateral face 25A forms part of a tenon 28A at the end of the former 3, said tenon fitting into a mortise 28B which is at the facing end of the adjacent former 3 and the base of which is formed by the concave lateral face 25B of the adjacent former 3. Each tenon 28A is defined axially by two flat parallel guide surfaces 29A and 30A which face outwardly and are radial to the axis 10. Similarly, each mortise 28B is defined axially by two flat parallel surfaces 29B and 30B which face towards each other and are also radial to the axis 10. The distance between the surfaces 29B and 30B of the mortise is slightly greater than the distance between the surfaces 29A and 30A of the tenon, which enables the tenon 28A and the mortise 28B to slide relative to each other with the surface 29A against the surface 29B and the surface 30A against the surface 30B, thus prohibiting any degree of freedom parallel to the axis 10 while allowing a degree of freedom tangential to the axis 10 and a degree of freedom radial to axis 10.

Each tenon is flanked by two bearing faces 34A and 35A which connect the guide surfaces 29A and 30A respectively to the sides 32 and 33 axially defining the former 3 to which the tenon 28A belongs. These bearing faces 34A and 35A are preferably flat and parallel to the axis 10. Similarly each mortise 28B is flanked by two bearing faces 34B and 35B which connect the guide surfaces 29B and 30B respectively to the sides 32 and 33 of the former 3 to which said mortise 28B belongs, these bearings faces 34B and 35B lying opposite the faces 34A and 35A of the adjacent former 3. In the cold state, a space of thickness e exists between the bearing faces 34A and 34B, and between the bearing faces 35A and 35B.

Referring back to FIG. 1, a rigid belt 4 surrounds the vanes 2 and the formers 3. This belt is preferably cylindrical around the axis 10, being bounded externally by a convex circular surface 40 centered on the axis 10, and internally by a concave circular surface 41 also centered on the axis 10. Bearing against the surface 41 are the tips 18 of the vanes 2, as well as the external surfaces 27 of the formers 3.

A reinforcement ring 6 is placed against the concave inner wall 11 of the hub 1, the ring 6 being bounded externally by a convex cylindrical surface 45 which fits against the inner wall 11 of the hub, and internally by a concave cylindrical surface 46 centered on the axis 10. The ring 6 is reinforced by fibers 47 running through it, preferably in a direction tangential to the axis 10, the strength being optimized when these fibers 47 form perfect circles about the axis 10.

The assembly consisting of the hub, the vanes, the formers, the belt and the reinforcement ring is surrounded under vacuum by a sealed metallic envelope 5, which bears in particular upon the outer surface 40 of the belt 4, on the inner surface 46 of the reinforcement ring 6, and upon the sides 32 and 33 of the formers. The metallic envelope 5 may be hermetically welded under vacuum by an electron beam.

The thermal welding of the vanes 2 to the hub 1 and the final shaping of the blade portions 16 of the vanes will now be described.

The assembly surrounded by the sealed envelope 5 is placed in an autoclave and subjected to a progressive increase in temperature and pressure until the isothermal forging temperature and pressure for the materials of the hub 1 and the matrix of the vanes 2 are reached.

The pressure in the autoclave exerts on the hub 1 a radially outward compression force 50 from the inside of the hub 1, as well as an axial compression force parallel to the axis 10. The compression 50 which is exerted from the inside of the hub 1 tends to push the hub 1, the vanes 2 and the formers 3 against the inner wall 41 of the belt 4. The outer wall 12 of the hub 1 comes to bear upon the inner walls 26 of the formers 3 and pushes said formers so that their outer walls 27 come to bear against the inner wall 41 of the belt 4. The tips of the vanes also come to bear against the inner surface 41 of the belt 4.

Under the action of the temperature and pressure, the root 15 of each vane becomes welded in its groove 13 by mutual diffusion of the materials of the root 15 and of the hub 1, the hub 1 is pressed against the inner surfaces 26 of the formers 3, and the blade portions 16 of the vanes 2 undergo a compression force 51 as a result of the expansion of the formers bringing closer together the lateral faces 25A and 25B which bear respectively on the faces 17A and 17B of the blade portions.

It will be understood that the isostatic compression force 50 of the hub 1 is combined with the compression force 51 of the blade portions 16, thereby achieving jointly and in a single operation the welding of the vanes 2 to the hub 1 as well as the shaping of the blade portions 16 of the vanes 2.

The belt 4 is made of a material with a thermal expansion coefficient which is low or nil, whereas the formers 3 are made of a material with a high thermal expansion coefficient, both materials retaining their rigidity at the isothermal forging temperature of the hub and the vanes. The formers 3 expand under the action of temperature while being constricted radially by the belt 4, the inner diameter of which changes little or not at all. As a result, the expansion of the formers 3 brings the lateral faces 25A and 25B closer together, which compresses the blade portions of the vanes in the direction of their thickness and imparts to them a precise shape, thickness and position.

The bearing faces 34A, 34B and 35A, 35B indicated in FIG. 2 have, in the cold state, a circumferential clearance e between them equal to the effective expansion of the formers 3. As a result, the formers 3 abut in the hot state, i.e. they come into mutual contact at the bearing faces 34A, 34B and 35A, 35B, which improves the precision of the shaping, dimensioning (thickness), and the positioning of the blade portions of the vanes.

Although a smaller ratio may be adopted, the compression 51 of the blade portions 16 and the radially inward pressure 52 on the hub 1 exerted by the formers 3 is more effective when the ratio of the thermal expansion coefficient of the formers 3 to that of the belt 4 is at least equal to 5.

The hub may be made of a forgeable titanium alloy such as TA6V, and the vanes 2 and the reinforcement ring 6 may be made of a metallic composite comprising silicon carbide (SiC) or boron carbide fibers embedded in a TA6V matrix.

The belt 4 is preferably made of a carbon-carbon composite having a thermal expansion coefficient which is substantially nil, or of a composite reinforced by SiC fibers and having a thermal expansion coefficient which is very low, of the order of $10^{-6}$. The formers 3 are made of a material with a high thermal expansion coefficient, and are of sufficient mechanical strength at the isothermal forging temperature of the hub. A suitable material is Z35NCW15, which has a mean expansion coefficient of about $18.10^{-6}$ between 20° C. and 950° C.

The assembly is heated to a temperature of 950° C. under a pressure of 700 to 1000 bars, at which temperature the formers have expanded by about 1.7%. As the space between successive blade portions 16 is currently of the order of 10 times the thickness of a blade portion, the compression of a blade portion in the direction of its thickness may reach 17%. In practice, it is smaller as a clearance between the blade portions 16 and the formers 3 is necessary in the cold state to make it possible to insert the formers radially between the blade portions.

In practice, it is desirable to have a compression at least equal to 3% of the thickness of the blade portion 16, which, in the cold state, corresponds to a maximum clearance between the blade portions 16 and the formers 3 equal to 17%–3%, i.e. approximately 14% of the thickness of the blade portions.

It should be noted that this compression percentage is calculated on the thickest part of the blade portions, and it is accordingly more substantial on the thin parts of the blade portions.

The formers 3, the belt 4 and the envelope 5 will preferably be covered with a passivating coating such as alumina $Al_2O_3$ so as to prevent any risk of diffusion welding of these parts together or to the vanes 2, the hub 1 or the reinforcing ring 6.

It will of course be understood that the invention is not limited to the embodiment just described, but is intended to cover all the alternatives that can be envisioned without departing from the scope of the claims appearing hereinafter.

For example, instead of being fitted into grooves 13, the root 15 of each vane 2 may simply be applied against the outer surface 12 of the hub 1 to be subsequently welded to the hub by hot isostatic compression. The root would then have a flattened form extending widely on both sides of the blade portion 16 between the outer surface 12 of the hub 1 and the inner surface 26 of the formers 3. Also, the vanes need not be reinforced with fibers, the welding then being accompanied by a simple forging of the vanes.

Also, vanes may be used in which their blade portions are at their final thickness. During welding, the expansion of the formers brings them into contact with the blade portions to impart precise positioning and curvature to the blade portions without any forging.

Furthermore, one or more reinforcement rings 6 may be placed not only against the inner surface of the hub 11, but also against its flanks, either directly on the surface if they have the same radial thickness as the hub, or in grooves provided in the flanks of the hub.

The following advantages of the process in accordance with the invention will now be appreciated more clearly.

a) The compression 51 of the blade portions 16 of the vanes 2 during the welding of the vanes to the hub 1 enables the microporosities remaining in the material to be reduced, and also permits forging of the blade portions at a lower temperature, which reduces the grain size and the α phase proportion and, in consequence, subsequent heat treatments.

b) In the case of fiber-reinforced metallic composite vanes, completion of the compression during welding reduces the total time for which the elevated temperature of the material is maintained, which reduces the mutual contamination between the material of the fiber and the metal of the matrix. The possible utilization of a lower forging temperature further reduces this contamination.

c) The use of the expansible formers 3 bearing against the inside of the belt 4 and against one another through their surfaces 34a, 34b and 35a, 35b in the hot state achieves a strict geometry of the blade portions 16 of the vanes 2 at the periphery of the part, as well as of the hub surfaces 12, and thus limits the finishing and the subsequent perfecting which may be necessary for the article. Moreover, as the formers 3 have an expansion coefficient above that of the material of the article, they are easy to put in place and subsequently to remove.

Obviously, additional modifications and variations of the present invention are possible in light of the above teachings. It is therefore to be understood that within the scope of the appended claims, the invention may be practiced otherwise than as specifically described herein.

We claim:

1. A process for constructing a bladed circular metallic article which includes a hub and a plurality of vanes mounted on said hub, which comprises:

making said hub and said vanes separately from alloys which are forgeable under temperature and pressure conditions at which said alloys are diffusion weldable;

positioning said vanes on said hub;

subjecting said hub to isostatic compression and simultaneously compressing the blade portions of said vanes in the direction of the thickness thereof under conditions such that said vanes are diffusion welded to said hub and said blade portions of said vanes are shaped;

positioning two formers on opposite sides of each of said vanes so that a face of one of said formers is adjacent one lateral face of said blade portion of said vane, and a face of the other of said formers is adjacent the other lateral face of said blade portion, said faces of said formers each having a shape which is complimentary to the respective lateral face of said blade portion;

causing said formers to move closer together to bring said faces thereof into contact with said lateral faces of said blade portion to effect said compressing and shaping of said blade portion, wherein each of said formers has first and second lateral faces, said first lateral face comprising said face adjacent said one lateral face of said blade portion of one of said vanes, and said second lateral face comprising said face adjacent said other lateral face of said blade portion of the next vane; and placing a belt having a low coefficient of thermal expansion circumferentially around said vanes and said formers disposed therebetween such that the radially outer surfaces of said formers bear against the radially inner surface of said belt during said compressing of said blade portions of said vanes and wherein the coefficient of thermal expansion of said formers is at least five times higher than the coefficient of thermal expansion of said belt.

2. The process according to claim 1, wherein said faces of said formers each have a shape complimentary to the respective lateral face of said blade portion in a finished state.

3. The process according to claim 1, which comprises disposing said formers so that a clearance is formed between successive formers in the circumferential direction in a cold state, and abutting said formers against each other in a hot state during said compressing of said blade portions of said vanes.

4. The process according to claim 3, wherein successive formers having interengaging mortise and tenon guides which prevent relative movement therebetween in a direction parallel to the geometrical axis of the hub.

5. The process according to claim 1, which comprises combining said isostatic compression of said hub with a reaction force exerted on said hub in a direction towards the geometrical axis thereof.

6. The process according to claim 5, wherein the radially inner surfaces of said formers face the outer surface of said hub and have a shape complimentary to said outer surface of said hub.

7. The process according to claim 1, which comprises engaging the tips of said vanes against said radially inner surface of said belt during said compressing of said blade portions of said vanes.

8. The process according to claim 1, wherein said vanes each have a root, which comprises providing said hub with grooves and fitting the roots of said vanes in said grooves, respectively.

9. The process according to claim 1, which comprises reinforcing said hub with fibers.

10. The process according to claim 1, which comprises reinforcing said vanes with fibers.

* * * * *

UNITED STATES PATENT AND TRADEMARK OFFICE
CERTIFICATE OF CORRECTION

PATENT NO. : 5,678,164
DATED : OCTOBER 14, 1997
INVENTOR(S) : BERTHELEMY ET AL

It is certified that error appears in the above-identified patent and that said Letters Patent is hereby corrected as shown below:

Column 1, line 43, change "mould" to --mold--.

Column 4, line 26, after "each", insert --of the--.

Column 6, line 36, change "of" to --on--.

Signed and Sealed this

Twelfth Day of May, 1998

BRUCE LEHMAN

Attest:

Attesting Officer

Commissioner of Patents and Trademarks